United States Patent [19]

Huber et al.

[11] 4,244,742

[45] Jan. 13, 1981

[54] PROCESS FOR THE PRODUCTION OF AQUEOUS BASED INNER TIRE RELEASE COMPOSITIONS

[75] Inventors: Peter Huber; Jürgen Meusel, both of Burghausen, Fed. Rep. of Germany

[73] Assignee: Wacker-Chemie GmbH, Munich, Fed. Rep. of Germany

[21] Appl. No.: 48,739

[22] Filed: Jun. 15, 1979

[30] Foreign Application Priority Data

Jun. 27, 1978 [DE] Fed. Rep. of Germany ....... 2828122

[51] Int. Cl.$^3$ .............................................. B28B 7/36
[52] U.S. Cl. ................................................. 106/38.22
[58] Field of Search ..................................... 106/38.22

[56] References Cited

U.S. PATENT DOCUMENTS

| | | | |
|---|---|---|---|
| 3,713,851 | 1/1973 | Cekada | 106/38.22 |
| 3,872,038 | 3/1975 | Adams et al. | 106/38.22 |
| 4,029,511 | 6/1977 | Carson et al. | 106/38.22 |

*Primary Examiner*—Maurice J. Welsh

*Attorney, Agent, or Firm*—Hammond & Littell, Weissenberger and Muserlian

[57] ABSTRACT

The invention concerns an improvement in the process for the production of dispersions of diorganopolysiloxanes and lubricant-acting inorganic silicates in water, whereby these dispersions contain, in addition to the above-mentioned substances, lecithin and nonionic emulsifiers, as well as solvents, ionic emulsifiers, lubricants other than inorganic silicates and diorganopolysiloxane, bactericides, fungicides, thickeners, antifoaming agents, rust inhibitors and dyes. The improvement is achieved by emulsifying the lecithin, nonionic emulsifier and water with each other before this mixture is mixed with at least 80% by weight of the diorganopolysiloxane contained in the finished dispersion, and, optionally, lubricants other than inorganic silicates and diorganopolysiloxanes. Furthermore, the invention concerns the application of the dispersions produced according to the invention as release agents, especially as inner tire release agents.

11 Claims, No Drawings

PROCESS FOR THE PRODUCTION OF AQUEOUS BASED INNER TIRE RELEASE COMPOSITIONS

BACKGROUND OF THE INVENTION

This invention relates to an improved process for the production of inner tire release agent dispersions based on diorganopolysiloxanes and lubricant-acting inorganic silicates where the constituents lecithin, nonionic emulsifiers and water are emulsified together before this mixture is admixed with at least 80% by weight of the diorganopolysiloxanes contained in the finished dispersion.

Dispersions of diorganopolysiloxanes and inorganic silicates in water acting as a lubricant, whereby these dispersions contain, in addition to the above-mentioned substances, lecithin and nonionic emulsifiers, as well as, if necessary, solvents, ionic emulsifiers, lubricants other than inorganic silicates and diorganopolysiloxanes, bactericides, fungicides, thickeners, antifoaming agents, rust inhibitors and dyes, and their application as an inner tire release agent are already known and described in U.S. Pat. No. 3,872,038 to Adams et al. These dispersions, however, have a high viscosity and require a considerable length of time for screening. Moreover, their storage stability is poor and sedimentation readily occurs.

OBJECTS OF THE INVENTION

An object of the present invention is to develop an improvement in the process for the production of dispersions of diorganopolysiloxanes and inorganic silicates whereby the resulting dispersions are of a low viscosity, readily screenable and have good storage stability without sedimentation.

Another object of the present invention is the development of an improvement in the process for the production of an aqueous-based inner tire release dispersion comprising the steps of dispersing at least one diorganopolysiloxane and at least one lubricant-acting inorganic silicate in water in the presence of lecithin and nonionic surface-active emulsifiers and optionally an added content of solvents, ionic surface-active emulsifiers, lubricants other than inorganic silicates and diorganopolysiloxanes, bactericides, fungicides, thickeners, antifoaming agents, rust inhibitors and dyes, and recovering said aqueous-based inner tire release dispersion, the improvement consisting essentially of emulsifying together said lecithin, at least a part of said nonionic surface-active emulsifier and water before this emulsion is mixed with at least 80% by weight of the total weight of diorganopolysiloxane and the optionally present lubricants other than inorganic silicates and diorganopolysiloxanes or before said lecithin and said nonionic surface-active emulsifier required for emulsifying with said lecithin is mixed with at least 80% by weight of the total weight of diorganopolysiloxane and the optionally present lubricants other than inorganic silicates and diorganosiloxanes.

These and other objects of this invention will become more apparent as the description thereof proceeds.

DESCRIPTION OF THE INVENTION

The subject of the invention is a process for the production of dispersions of diorganopolysiloxanes and inorganic silicates in water as a lubricant, these dispersions containing, in addition to the above-mentioned substances, lecithin and nonionic surface-active emulsifiers as well as, optionally, solvents, ionic surface-active emulsifiers, lubricants other than inorganic silicates and diorganopolysiloxanes, bactericides, fungicides, thickeners, antifoaming agents, rust inhibitors and dyes, characterized in that the lecithin, at least some of the nonionic surface-active emulsifier and water are emulsified with each other before this emulsion is mixed with at least 80% of the diorganopolysiloxane contained in the finished dispersion and, optionally, lubricants other than inorganic silicates and diorganopolysiloxanes, or before the lecithin and the nonionic surface-active emulsifier necessary for emulsifying with lecithin are mixed with at least 80% of the diorgano-polysiloxane contained in the finished dispersion and, optionally, lubricants other than inorganic silicates and diorganopolysiloxanes.

The invention, therefore, relates to an improvement in the process for the production of an aqueous-based inner tire release dispersion comprising the steps of dispersing at least one diorganopolysiloxane and at least one lubricant-acting inorganic silicate in water in the presence of lecithin and nonionic surface-active emulsifiers and optionally an added content of solvents, ionic surface-active emulsifiers, lubricants other than inorganic silicates and diorganopolysiloxanes, bactericides, fungicides, thickeners, antifoaming agents, rust inhibitors and dyes, and recovering said aqueous-based inner tire release dispersion, the improvement consisting essentially of emulsifying together said lecithin, at least a part of said nonionic surface-active emulsifier and water before this emulsion is mixed with at least 80% by weight of the total weight of diorganopolysiloxane and the optionally present lubricants other than inorganic silicates and diorganopolysiloxanes or before said lecithin and said nonionic surface-active emulsifier required for emulsifying with said lecithin is mixed with at least 80% by weight of the total weight of diorganopolysiloxane and the optionally present lubricants other than inorganic silicates and diorganosiloxanes.

Compared to the presently known dispersions of this type, the dispersions produced and used according to the invention have the following advantages:

1. The dispersions produced and used according to the invention have a lower viscosity with the same content of dispersed substances.
2. The dispersions produced and used according to the invention can be screened within a shorter time.
3. The dispersions produced and used according to the invention are very stable in storage.
4. The dispersions produced and used according to the invention can be sprayed without trouble, even when filters are attached to the spray nozzles.
5. The dispersions produced and used according to the invention yield finer and more homogenous coats on spraying.

The invention also concerns the application of the dispersions produced as described in the foregoing and in the following paragraphs as release agents, particularly as inner tire release agents. An inner tire release agent is one which facilitates the separation of the molding bag from the inner carcass of the molded tire.

Commercial soybean lecithin is preferred as the lecithin due to its easy availability.

Examples of nonionic surface-active emulsifiers are the polyethylene glycol ethers of alkanols or phenol or alkylphenols, such as polyethylene glycol ethers of linear or branched alkanols containing 13 to 18 carbon atoms with 4 to 25 ethylene oxide units per molecule, for example, polyoxyethylene stearyl ether with 10 ethylene oxide units per molecule, polyoxyethylene dicetyl ether and trimethylnonyl ether of polyethylene glycol, which contains 14 ethylene oxide units per molecule, and nonylphenoxypoly(ethylene oxy)-ethanols, as well as polyoxyethylene sorbitol hexastearate and polyoxyethylene sorbitanoleate with a saponification number of 102 to 108, and a hydroxyl number 25 to 35; polyethylene glycol ethers of linear or branched alkanols containing 13 to 18 carbon atoms with 4 to 25 ethylene oxide units per molecule are preferred.

Preferably the nonionic emulsifier is used in amounts of 10% to 1000% by weight, based on the weight of lecithin, in the production of the emulsions of lecithin, nonionic surface-active emulsifier and water.

In the production of the emulsions of lecithin, nonionic surface-active emulsifier and water, the water is used in amounts of 50% to 90% by weight, based on the total weight of lecithin, nonionic surface-active emulsifier and water.

The lecithin is preferably mixed with the nonionic surface-active emulsifier before the water is added.

The emulsion of lecithin, nonionic emulsifier and water can be diluted with any amount of water without the action of shearing force.

The emulsifying of the lecithin, nonionic surface-active emulsifiers and water is preferably carried out in a comminution device. The comminution devices which are used within the framework of the invention are those devices which are used, for example, to emulsify a liquid, which is not miscible by itself with the other liquid, with the latter, or to disperse solids with small particles size to liquids. The phenomena which distinguish the action of the comminution device according to the invention from simple stirrers are high shearing forces, cavitation, twist and turbulence. In particular, the comminution devices according to the invention are devices where cavitation occurs in the treatment of liquids. The process is a homogenization process or homogenization with cavitation.

An example of a comminution device that can be used according to the invention is a high-pressure homogenizer, where the homogenization process takes place in the so-called homogenizing valves in which the mixture of liquids which is under a high pressure, or the suspension of lecithin particles which is under a high pressure according to the invention, expands abruptly in the aqueous medium, hence, is exposed to a much lower external pressure.

The comminution devices used are particularly those which permit the treatment of suspension under conditions under which liquids which are not miscible by themselves, like water and benzene, are emulsified with each other, forming, in the absence of surfactants or naturally unstable emulsifiers, emulsions with a particle size between 0.1 and 10μ.

An example of the above-described homogenizers are the commercially available "Ultraturrax" made by Janke and Kunkel IKA-Werk, Stauffen/Breisgau, Germany.

This is a high-speed intensive mixer (10,000 ppm) where the frequency is adjustable from sub-sonic to supersonic and acceleration forces of more than 100 m/sec are obtained. By the use of this equipment, emulsions where the particle sizes are in the range of 0.5 to 10μ are obtained.

Other comminution devices that can be used according to the invention, as homogenizers, are the liquid mixers, which consist of stator and rotor units. An example is the multifrequency liquid mixers, which consist of a multi-stage system of stator plates and rotor disks, where the stator plates have circular openings through the holes of which the material to be mixed passes in an axial direction. These openings are arranged deep in annular channels provided symmetrically on both sides of the stator plates. The flanks of the channels can have specially designed indentations. The likewise annularly arranged shearing pins of the rotor disks run in the channels.

The emulsion of lecithin, nonionic surface-active emulsifier and water is preferably used in the final dispersion in amounts of a total of 1% to 20% by weight, particularly 5% to 10% by weight of the lecithin and nonionic surface-active emulsifier contained in this emulsion, based on the weight of inorganic silicate acting as a lubricant.

The emulsion of lecithin, nonionic surface-active emulsifier and water and, optionally, other substances, (see below), can be mixed with the same diorganopolysiloxanes which are or can also be contained in the presently known dispersions of diorganopolysiloxanes. In addition to the diorganopolysiloxanes, these diorganopolysiloxanes can also contain other types of siloxane units. Such other siloxane units are particularly triorganosiloxane units, which can be terminally arranged and/or along a chain of diorganopolysiloxane units, which also contain, possibly, monoorganosiloxane units and/or $SiO_{4/2}$ units. Monoorganosiloxane units and/or $SiO_{4/2}$ units can also be present in addition to the diorganosiloxane units, regardless of whether triorganosiloxane units are present or not. Preferably the diorganopolysiloxane units used according to the invention contain 1.75 to 2.25, particularly 1.9 to 2.1 SiC-bound organic radicals per silicon atom, and it is furthermore preferred if at least 90 mol.% of the siloxane units in the diorganopolysiloxane used according to the invention are diorganosiloxane units.

Preferably the organic radicals of the organopolysiloxanes used according to the invention are hydrocarbon radicals with 1-8 carbon atoms, and these hydrocarbon radicals can also be halogenated. Examples of hydrocarbon radicals with 1 to 18 carbon atoms are alkyls, such as methyl, ethyl, n-propyl, isopropyl, n-butyl and sec. butyl, as well as octyl, dodecyl and octadecyl;cycloalkyl, such as cyclohexyl; alkenyl, such as vinyl and allyl; aryl, such as phenyl; alkylphenyl, such as tolyl and phenylalkyl, such as benzyl. Examples of halogenated hydrocarbon radicals, with 1 to 18 carbon atoms are haloalkyl, such as 3,3,3-trifluoropropyl, and halophenyl, such as o-, p- and m-chlorophenyl. But particularly because of the easy accessibility, at least 80% of the number of the organic radicals in the diorganopolysilicates used according to the invention are preferably methyl. The diorganopolysiloxanes used according to the invention have a viscosity of at least 1000 mPa at 25° C. Their plasticity, measured by the parallel-plate-plastometer test according to ASTM-D 926-67, however, should not exceed 120 mm.

The diorganopolysiloxanes used according to the invention can have a narrow distribution of the molecular weight, hence consist of diorganopolysiloxanes which all have more or less the same viscosity. But the diorganopolysiloxanes used according to the invention can also have a wide distribution of the molecular weight. Likewise, the diorganopolysiloxanes used according to the invention can be identical or different regarding the type of the substituents and/or the degree of substitution.

Before the diorganopolysiloxanes used according to the invention are mixed with the emulsion of lecithin, nonionic emulsifier and water (and optionally other substances), they are preferably already present in emulsified form. These emulsified diorganopolysiloxanes can be substances which were emulsified in water by means of conventional emulsifiers used in the production of diorganopolysiloxane-in-water emulsions, after the desired molecular weight of the diorganopolysiloxanes had been obtained by polymerization, which took place substantially in the absence of water not formed by condensation during the polymerization. In addition, these diorganopolysiloxanes can be substances which were produced by emulsion polymerization, that is, by means of dodecyl-sulfonic acid, before emulsification.

Examples of emulsifiers used in the production of diorganopolysiloxane-in-water emulsions are nonionic surface-active emulsifiers, like the above-mentioned nonionic polyethylene glycol derivatives, and anionic surface-active emulsifiers, like sodium alkylaryl polyethylene glycol sulfonate, and partial sodium salts of phosphoric acid esters of an adduct of ethylene oxide and nonylphenol which contains 4 to 10 ethylene oxide units per molecule, with a molecular weight of 1112 and an acid number of 7 to 8.

Examples of organic solvents which can also be used in the production of the aqueous diorganopolysiloxane emulsions are linear or branched aliphatic hydrocarbons, like hexane, kerosene with a boiling range of 175° to 290° C., hexadecane, petroleum ether with a boiling range of 150° to 200° C., cycloaliphatic hydrocarbons, like cyclohexane, chlorinated aliphatic hydrocarbons, like trichloroethylene, trichloroethane, trichloromethane, carbon tetrachloride, and perchloroethylene, as well as aromatic hydrocarbons, like benzene, toluene and xylene.

In the production of aqueous diorganopolysiloxane emulsions to be used within the scope of the present invention, emulsifiers and solvents can also be used in the same amounts as they were or could be used hereto in the production of aqueous diorganopolysiloxane emulsions.

The portion of the diorganopolysiloxanes in the total weight of the dispersions produced and used according to the invention is preferably 2% to 25% by weight, particularly 5% to 18% by weight.

Up to 20% by weight of the total weight of diorganopolysiloxane contained in the finished dispersion can already be used as an additional substance in the preparation of the emulsion of lecithin, nonionic surface-active emulsifier and water. However, this is preferably not done.

The inorganic silicates which act as lubricants, within the framework of the invention, are the same inorganic silicates acting as lubricants which could be used hereto in the production of dispersions of diorganopolysiloxane and lubricant-acting inorganic silicates in water. Examples of these lubricant-acting inorganic silicates are natural or synthetic mica, alkaline earth silicates, like magnesium silicate, aluminum silicate, vermiculite, talcum and kaolin. Mica is particularly preferred as a lubricant-acting inorganic silicate, since it is highly effective as a lubricant and as a release agent, due to its layered structure, and its presence enhances the formation of channels in the coats resulting from the dispersions, through which the entrapped air can escape. Preferably the inorganic silicate used as a lubricant according to the invention has a particle size of 0.02 to 0.25 mm. At least a part of the inorganic silicate acting as a lubricant can be rendered hydrophobic by treating its surface with an organosilicon compound, like dimethyl diethoxysilane. Mixtures of different inorganic silicates can also be used.

The portion of the lubricant-acting inorganic silicate in the total weight of the dispersions produced and used according to the invention is preferably from 20% to 60% by weight.

At least a part of the lubricant-acting silicate can be used as an additional substance in the preparation of the emulsion of lecithin, nonionic surface-active emulsifier and water.

Examples of lubricants other than lubricant-acting inorganic silicates and diorganopolysiloxanes are polyethylene glycols, polypropylene glycols, and block copolymers of ethylene oxide and propylene oxide, these polyglycols having each a molecular weight of 400 to 4000, preferably 2000 to 3000. The use of lubricants other than inorganic silicates and diorganopolysiloxane is not absolutely necessary. However, if such other additional lubricants are used, their portion in the total weight of the dispersions produced and used according to the invention is preferably not more than 25% by weight.

Up to 20% by weight of the lubricant contained in the finished dispersion, other than the lubricant-acting inorganic silicate, and diorganopolysiloxane, can already be used as an additional substance in the preparation of the emulsion of lecithin, nonionic surface-active emulsifier and water. However, this is preferably not done.

Examples of bactericides, or fungicides which can be employed in the final dispersions are sorbic acid, hexamethylene tetramine/1,3-dichloropropane adducts, formaldehyde, and 6-acetoxy-2,4-dimethyl-m-dioxane. If bactericides or fungicides are used, they are preferably used in amounts of 0.1% to 1.0% by weight, based on the total weight of the finished dispersion.

At least a part of the bactericide or fungicide can already be used as an additional substance in the preparation of the emulsion of lecithin, nonionic surface-active emulsifier and water.

Examples of thickeners which can be employed in the final dispersions are carboxyethyl cellulose, carboxymethyl cellulose, sodium carboxymethyl cellulose, sodium carboxymethyl hydroxyethyl cellulose, hydroxyethyl cellulose, methylethyl cellulose, methyl hydroxyethyl cellulose, polyvinyl alcohol, and inorganic silicates acting as thickeners, such as magnesium aluminum silicate and bentonite. If thickeners are used, they are preferably used in amounts of 0.01% to 1.5% by weight, based on the total weight of the finished dispersion.

At least a part of the thickener, just like a part of the antifoaming agent, rust inhibitor and dye, can already be used as an additional substance in the preparation of the emulsion of lecithin, nonionic surface-active emulsifier and water.

The portion of water in the total weight of the dispersion produced and used according to the invention is preferably at least 20% by weight.

The emulsion of lecithin, nonionic surface-active emulsifier and water and, optionally, other substances can be mixed with the other constituents of the dispersions produced and used according to the invention in any desired order.

Preferably, however, at least a part of the emulsion of lecithin, nonionic surface-active emulsifier and water (and, optionally, other substances) is mixed, simultaneously with the lubricant-acting inorganic silicate, with the other constituents of the dispersions produced and used according to the invention.

For mixing the constituents of the dispersions produced and used according to the invention, any devices that are also used at present for the preparation of the known aqueous diorganopolysiloxane emulsions in which organic solids are dispersed, can be used.

The dispersions produced according to the invention are suitable not only as inner tire release agents, hence as agents sometimes also called "lubricants for tire molding" or "bag lubricants for the tire production" or as "rubber bag lubricants for tire production", but generally as release agents in the pressure forming of rubber and plastic.

The application of the dispersion on surfaces to be shaped, for example, on the inside of a blank carcass, can be effected in any manner suitable for the application of release agents on surfaces to be shaped, such as by spraying or brushing.

The parts indicated below relate all to the weight, unless stated otherwise. The following Examples are illustrative of the invention without being limitative.

EXAMPLES

A. Preparation of the aqueous diorganopolysiloxane emulsion 30 parts of petroleum ether with a boiling range of 150° to 200° C. were mixed with 15 parts of a dimethylpolysiloxane having an Si-bound hydroxyl group in each of the terminal units, with a plasticity, measured according to the parallel-plate-plastometer test ASTM-D 926-67, of 100 mm, 25 parts of a dimethylpolysiloxane terminated by trimethyl-siloxy groups, with a viscosity of 350 mPa at 25° C. and 30 parts of a dimethyl polysiloxane terminated by trimethyl siloxy groups, with a viscosity of 60,000 mPa at 25° C., in a planetary mixer rotating at 64 rpm, for the formation of a homogeneous mixture. 60 parts of the mixture thus obtained were stirred into a mixture of 2 parts of nonylphenoxypoly-(ethyleneoxy)-ethanol, which contains 6 ethylene oxide units (Arkopal N 060 ®) available from Hoechst AG, Frankfurt, Germany), 5 parts of nonylphenoxy(ethyleneoxy)-ethanol, which contains 23 ethylene oxide units (Arkopal N 230 ®) and 4 parts of water for the formation of a stable water-in-oil emulsion. 56 parts of water were added slowly under continued stirring to this water-in-oil emulsion so that an oil-in-water emulsion is obtained.

B. Production of the hydrophobic-rendered mica

5% by weight, based on the weight of the mica, of dimethyl diethoxysilane were poured over wet-ground muscovite with a particle size of 325 mesh (0.045 mm) contained in a polyethylene bag. Then the polyethylene bag was closed and left standing for 14 days at room temperature.

EXAMPLE 1

(a) A mechanical high-frequency apparatus according to Prof. Willems, Ultraturrax ®, was charged with 300 parts of commercial soybean lecithin (Lipowet 100 ®, available from Lucas Meyer, Hamburg, Germany) and 100 parts of polyoxyethylene stearyl ether containing 10 ethylene oxide units (Genapol S 100 ®, available from Hoechst AG, Frankfurt, Germany) and the mixture was processed until a homogeneous emulsion was formed. 600 parts of water were added in the same apparatus to the mixture thus obtained within one hour.

(b) 16 parts of the homogeneous emulsion of lecithin, nonionic surface-active emulsifier and water, prepared as described under (a), were added in a mixer at 1000 rpm to 600 parts of water which was first mixed with 0.2 parts of a 4% by weight solution of carboxymethyl cellulose in water. Under continued stirring at 1000 rpm, 100 parts of a block copolymer of 70 mol% ethylene oxide units and 30 mol% propylene oxide units with an average molecular weight of 3000, were added to the mixture thus obtained. Thereafter, 200 parts of the aqueous organopolysiloxane emulsion obtained in (A) above, then 8 parts of a commercial antifoaming agent based on diorganopolysiloxane ("SE 47" available from Wacker-Chemie GmbH, Munich, Germany) and finally 700 parts of mica were consecutively added. The mica was added to the mixture of the other constituents within 5 minutes. Then the stirring was continued for 5 minutes at 1000 rpm.

The properties of the final dispersion are reported in the following Table.

EXAMPLE 2

4 parts of the emulsion of lecithin, nonionic surface-active emulsifier and water, produced as described in Example 1 under (a), were added to 600 parts of water which had been mixed first with 0.2 parts of sodium carboxymethyl cellulose, in a mixer rotating at 1000 rpm. Under continued stirring at 1000 rpm, 100 parts of the block copolymer of 70 mol% ethylene oxide units and 30 mol% propylene oxide units with an average molecular weight of 3000, were added to the mixture thus obtained. Thereafter, 200 parts of the aqueous diorganopolysiloxane emulsion obtained in (A) above, then 8 parts of the commercial antifoaming agent based on diorganopolysiloxane ("SE 47"), then within 3 minutes, simultaneously but separated from each other, 400 parts of hydrophobic-rendered mica obtained in (B) above, and 6 parts of the emulsion of lecithin, nonionic surface-active emulsifier and water, produced as described in Example 1 under (a), and finally within 2 minutes simultaneously but separately 300 parts of hydrophobic-rendered mica obtained in (B) above and 6 parts of the emulsion of lecithin, nonionic surface-active emulsifier and water produced as described in Example 1 under (a), were added to the dispersion. Then the stirring was continued for 5 minutes at 1000 rpm.

The properties of the final dispersion are reported in the following Table.

EXAMPLE 3

600 parts of water were added to a mixer rotating at 1000 rpm, then 0.2 parts of a 4% by weight solution of carboxymethyl cellulose in water, then 100 parts of the block copolymer of 70 mol% ethylene oxide units and 30 mol% propylene oxide units as in Example 1, then 200 parts of the aqueous diorganopolysiloxane emulsion obtained in (A) above, then 8 parts of the commercial antifoaming agent based on diorganopolysiloxane ("SE 47") and finally within 5 minutes 700 parts mica were added in the mixer. The mica employed had been mixed first for 24 hours in a ball mill with 16 parts of the emulsion of lecithin, nonionic surface-active emulsifier and water as described in Example 1 under (a). Thereafter, the stirring was continued for another 5 minutes at 1000 rpm.

The properties of the final dispersion are reported in the following Table.

COMPARISON TEST 1

The procedure described in Example 1 under (b) was repeated with the variation that instead of the 16 parts of the emulsion of lecithin, nonionic surface-active emulsifier and water being added, 4.8 parts of soybean lecithin (Lipowet 100 ®) were used. The remainder of the procedure was the same and the properties of the final dispersion are reported in the following Table.

COMPARISON TEST 2

The procedure described in Example 1 under (b) was repeated with the variation that, instead of the 16 parts of the emulsion of lecithin, nonionic surface-active emulsifier and water being added, 4.8 parts of soybean lecithin (Lipowet 100 ®) and 1.2 parts of the polyoxyethylene stearyl ether with 10 ethylene oxide units were added successively to the water containing 0.2 parts of the carboxymethyl cellulose solution in the mixer at 1000 rpm. The remainder of the procedure was the same and the properties of the final dispersion are reported in the following Table.

The following Table shows the properties of the dispersions produced according to the Examples and the Comparison Tests.

TABLE

| Dispersion produced according to | Viscosity of the dispersion 2 hours after preparation in mPa* | Duration of Screening in mins.** | Settling after 14 days ml | Weight of the coat after spraying*** gm |
|---|---|---|---|---|
| Example 1 | 215 | 10 | 7.8 | 2.2 |
| Example 2 | 220 | 12 | 6.4 | 2.3 |
| Example 3 | 215 | 15 | 6.4 | 2.3 |
| Comparison test 1 | 480 | 40 | 12.0 | 1.4 |
| Comparison test 2 | 460 | 40 | 11.0 | 1.2 |

*Brookfield viscometer RVF, spindle, No. 2, 2 rpm
**2000 gm of dispersion through 250 micrometer screen with rotating stripper
***10 seconds with De Vilbriss color spray gun 1.0 mm wide jet nozzle, compound air at 6 bar, at distance of 35 cm on rotating disk with a diameter of about 22 cm.

The above Table demonstrates the improved results obtained when the lecithin is first emulsified, preferably by homogenization with cavitation, together with a nonionic surface-active emulsifier and water, before being added to the other ingredients of the dispersion. The dispersions of the invention had lower viscosities, improved screening rates, reduced settling rates and improved passage through a spray gun nozzle as compared to conventionally prepared lecithin-containing dispersions.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process for the production of an aqueous-based inner tire release dispersion comprising the steps of dispersing at least one diorganopolysiloxane and at least one lubricant-acting inorganic silicate in water in the presence of lecithin and nonionic surface-active emulsifiers, and recovering said aqueous-based inner tire release dispersion, the improvement consisting essentially of emulsifying together said lecithin, at least a part of said nonionic surface-active emulsifier and water before this emulsion is mixed with at least 80% by weight of the total weight of diorganopolysiloxane in the form of an aqueous emulsion and the optionally present lubricants other than inorganic silicates and diorganopolysiloxanes.

2. The process of claim 1 wherein a polyethylene glycol ether of linear or branched chain alcohols with 13 to 18 carbon atoms selected from the group consisting of alkanols and alkenols, with from 4 to 25 ethylene oxide units is employed as said nonionic surface-active emulsifier in the production of the emulsion of lecithin, nonionic surface-active emulsifier and water.

3. The process according to claims 1 or 2 wherein said emulsion of lecithin, nonionic surface-active agent and water is emulsified by homogenization.

4. The process of claim 3 wherein said homogenization step is effected by cavitation.

5. The process according to claims 1 or 2 wherein said nonionic surface-active emulsifier in the emulsions of lecithin, nonionic surface-active emulsifier and water, is used in amounts of from 10% to 1000% by weight, based on the weight of lecithin, and that water is used in amounts of from 50% to 90% by weight, based on the total weight of lecithin, nonionic surface-active emulsifier and water.

6. The process according to claims 1 or 2 wherein said lecithin is emulsified with said nonionic surface-active emulsifier before water is added.

7. The process according to claims 1 or 2 wherein said emulsion of lecithin, nonionic surface-active emulsifier and water is used in amounts of a total from 1% to 20% by weight of the weight of lecithin and nonionic surface-active emulsifier contained in this emulsion, based on the weight of said lubricant-acting inorganic silicate.

8. The process according to claim 1 wherein at least part of said emulsion of lecithin, nonionic surface-active compound and water is mixed with said lubricant-acting inorganic silicate before mixing with the other constituents of said dispersion.

9. The aqueous based inner tire release dispersion produced by the process of claim 1.

10. In the process for obtaining a parting between a mold and a thermosetting composition selected from the group consisting of rubber and plastic comprising applying a thin coating of a release agent to the surface selected from the group consisting of mold surface, thermosetting composition surface and both of said surfaces, thermosetting said thermosetting composition and separating said thermoset composition from said mold, the improvement consisting of employing the dispersion of claim 1 as the release agent.

11. The process of claim 1 wherein said dispersion contains other components of the type:
solvents, ionic surface-active emulsifiers, lubricants other than inorganic silicates and diorganopolysiloxanes, bactericides, fungicides, thickeners, antifoaming agents, rust inhibitors and dyes.

* * * * *